(12) United States Patent
Takeda

(10) Patent No.: US 11,489,981 B2
(45) Date of Patent: Nov. 1, 2022

(54) INFORMATION PROCESSING APPARATUS, CONTROL METHOD, AND MEDIUM

(71) Applicant: Canon Kabushiki Kaisha, Tokyo (JP)

(72) Inventor: Kyohei Takeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/345,111

(22) Filed: Jun. 11, 2021

(65) Prior Publication Data

US 2021/0392237 A1    Dec. 16, 2021

(30) Foreign Application Priority Data

Jun. 15, 2020  (JP) .............................. JP2020-103230

(51) Int. Cl.
*H04N 1/00* (2006.01)
*G06F 21/46* (2013.01)

(52) U.S. Cl.
CPC ......... *H04N 1/00854* (2013.01); *G06F 21/46* (2013.01); *H04N 1/00082* (2013.01); *H04N 1/00411* (2013.01); *H04N 1/00795* (2013.01)

(58) Field of Classification Search
CPC ........ G06F 21/32; G06F 21/45; G06F 21/608; H04N 1/00854
See application file for complete search history.

(56) References Cited

U.S. PATENT DOCUMENTS

| 2007/0206214 | A1* | 9/2007 | Kano | ...................... G06F 21/35 358/1.15 |
| 2007/0216934 | A1* | 9/2007 | Yamada | .............. G06F 21/6209 358/1.15 |
| 2009/0059267 | A1* | 3/2009 | Sato | ...................... G06F 3/1239 358/1.14 |
| 2015/0324675 | A1* | 11/2015 | Morii | ................. G06K 15/4095 358/1.14 |
| 2017/0279997 | A1* | 9/2017 | Ozawa | ................. H04N 1/0044 |

FOREIGN PATENT DOCUMENTS

JP          5996012          9/2016

* cited by examiner

Primary Examiner — King Y Poon
Assistant Examiner — Michael L Burleson
(74) Attorney, Agent, or Firm — Venable LLP

(57) ABSTRACT

An image forming apparatus operable to accept a login of a user by an input of medium information stored in a storage medium or an input via a user interface is provided. The apparatus comprises a storage to store account information that includes user identification information of a registered user and can further include the medium information associated with the user; a reader to read the medium information from the storage medium; a user interface to display a screen and accept an input; and a controller configured to accept a login by a user, wherein the controller, in a case where, at the time of a login of a user via the user interface, the medium information associated with a corresponding user is not registered, registers, in association with the corresponding user, the medium information inputted by the reader.

12 Claims, 9 Drawing Sheets

NEW USER REGISTRATION

| USER NAME: | Alice |
| --- | --- |
| PASSWORD: | ****** |
| PASSCODE: | ****** |
| EMAIL: | alice@conon.com |
| ICON: | BALL [SELECT] |
| CARD ID: | UNREGISTERED [REGISTER] |

[CANCEL] [REGISTER]

408, 421, 410, 409, 411

KEYBOARD AUTHENTICATION

| USER NAME | Alice |
| --- | --- |
| PASSWORD | ****** |

( LOG IN )

412

IC CARD LOG IN

PLEASE HOLD IC CARD OVER

[TO KEYBOARD AUTHENTICATION]

PASSCODE INPUT

USER NAME   Alice

PASSCODE   [ ***** ]

IC CARD IS UNREGISTERED
IC CARD AUTHENTICATION CAN BE USED ( LOG IN )

PASSCODE INPUT

USER NAME   Bob

PASSCODE   [ ***** ]

IC CARD IS UNREGISTERED
IC CARD CAN BE REGISTERED BY HAVING
IC CARD TOUCH AND INPUTTING PASSCODE.

( LOG IN )

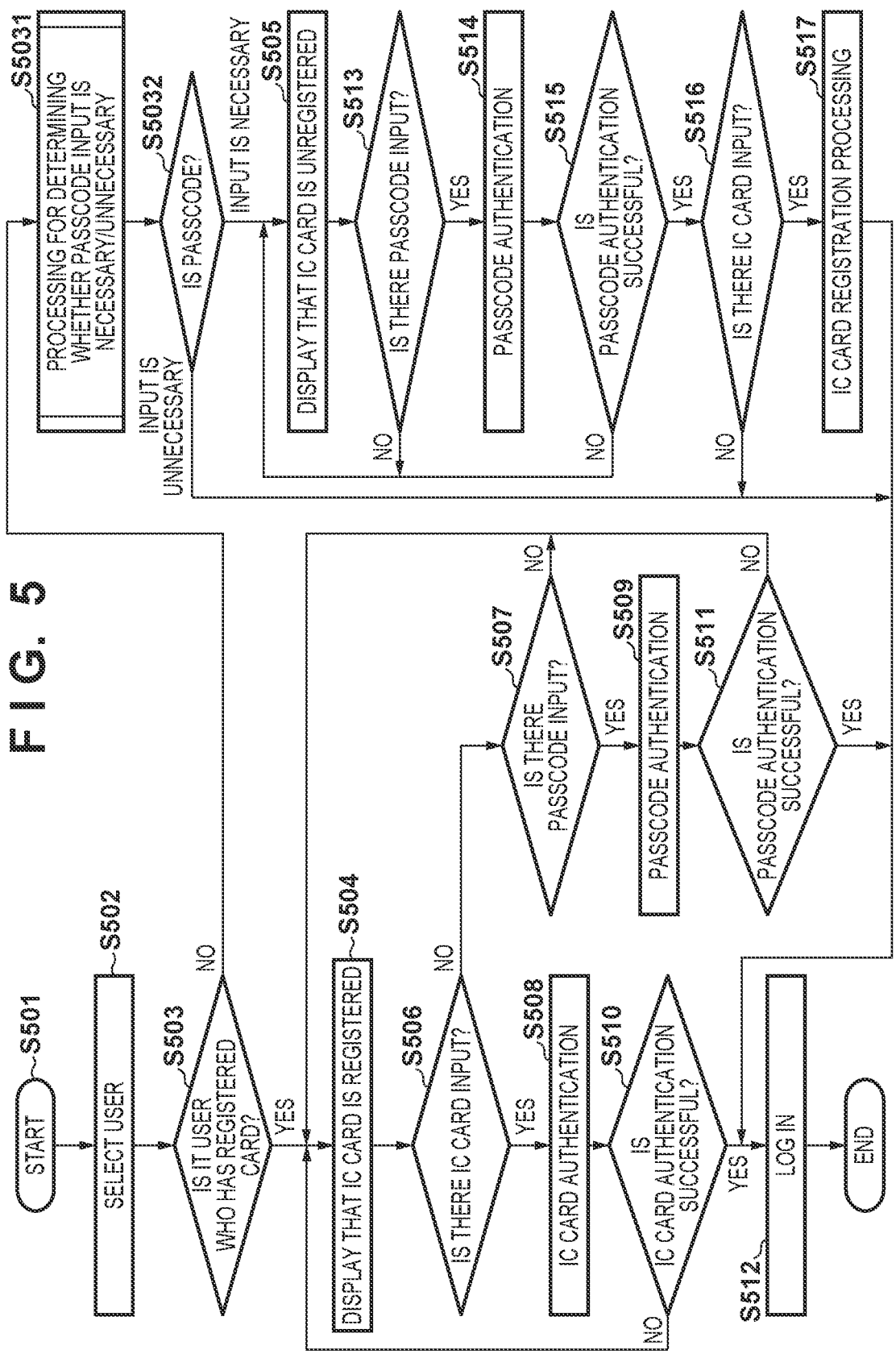

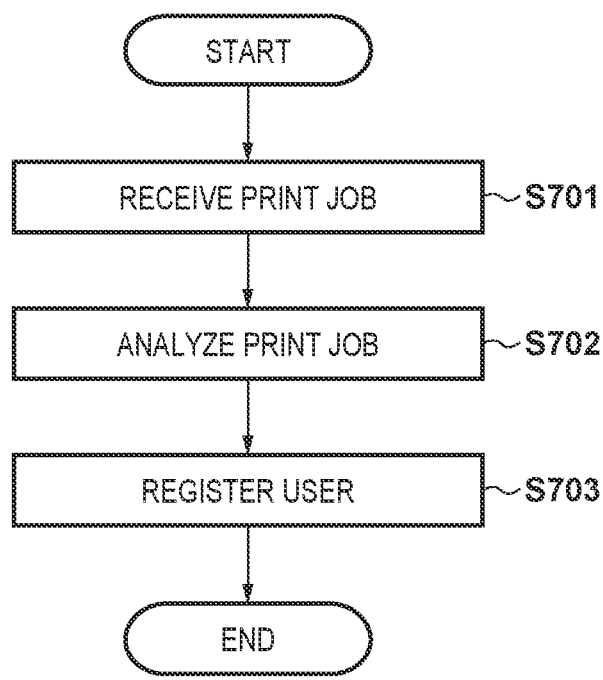

INFORMATION PROCESSING APPARATUS, CONTROL METHOD, AND MEDIUM

BACKGROUND OF THE INVENTION

Field of the Invention

The present invention relates to an information processing apparatus that comprises a login function, a control method, and a medium.

Description of the Related Art

There are image forming apparatuses that use both a simple login method in which buttons of a plurality of users are displayed on a screen and a user logs in by pressing their button therefrom and a login method in which a user is authenticated by a card reading (refer to, for example, Japanese Patent No. 5996012). Here, a function that displays buttons of a plurality of users on a screen and allows a user to log in by selecting their button therefrom is referred to as a simple login function.

By using a user authentication function of Japanese Patent No. 5996012, users who have performed IC card registration performs IC card authentication by having an IC card touch. A user, in a case where they forget an IC card or have not performed IC card registration, can log in using the simple login function. In such a case, their identity cannot be confirmed simply by selecting their button; accordingly, passwords can be set. However, if passwords are set, password input would be prompted at every login, which would be burdensome for users.

With IC card authentication, users only need to have their IC cards touch; however, it would be costly for an administrator to provide IC cards for the required number of users and would further incur registration work. In contrast to this, if users that already have IC cards can personally register their IC cards and use them for login, that would improve security and user convenience.

SUMMARY OF THE INVENTION

The present invention provides a mechanism for a user themself to perform IC card registration at the time of using both simple login and IC card authentication.

The present invention has the following configuration. That is, according to one aspect of the present invention, an image forming apparatus operable to accept a login of a user by an input of medium information stored in a storage medium or an input via a user interface, the apparatus comprising:

at least one processor and at least one memory couple to each other and cooperating to act as:

a storage configured to store account information that includes user identification information of a registered user and can further include the medium information associated with the user;

a reader configured to read the medium information from the storage medium;

a user interface configured to display a screen and accept an input; and a controller configured to accept a login by a user, wherein the controller, in a case where, at the time of a login of a user via the user interface, the medium information associated with a corresponding user is not registered, registers, in association with the corresponding user, the medium information inputted by the reader is provided.

By virtue of the present invention, a user themself can easily perform IC card registration at the time of using both simple login and IC card authentication.

Further features of the present invention will become apparent from the following description of exemplary embodiments with reference to the attached drawings.

BRIEF DESCRIPTION OF THE DRAWINGS

FIG. 4A to FIG. 4J are views illustrating user interfaces displayed on an operation unit of the MFP 101.

FIG. 5 is a flowchart illustrating IC card registration processing.

FIG. 7 is a flowchart illustrating user registration processing at the time of receiving a print job.

DESCRIPTION OF THE EMBODIMENTS

Figure 1:
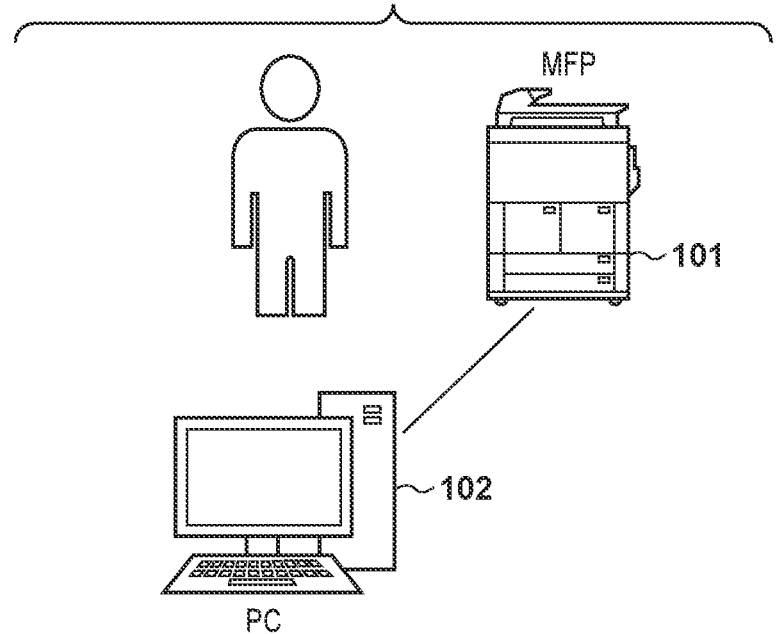
FIG. 1 is a view illustrating a configuration of a system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

<System Configuration>

FIG. 1 is a configuration diagram illustrating a system that includes an image forming apparatus to which the present invention is applied. An MFP 101 is an MFP (Multifunction Peripheral) and is an information processing apparatus (or an image forming apparatus) according to the present embodiment.

The MFP 101 supports a user authentication method that uses a keyboard (also called keyboard authentication) in which a user ID (user identification information) and a passcode (or a password) are inputted. In a case where the inputted user ID and passcode are correct, login to the MFP 101 is performed. Correct is that, for example, the inputted user ID and passcode have been registered in advance in association with each other. Also, the MFP 101 supports IC card authentication that uses IC cards as storage media. When a user operates to have an IC card read, the MFP 101 reads IC card information stored in the IC card. In the IC card information, a card ID, which is medium identification information (or medium information), is included. Then, a match with the IC card information stored in a user information storage region of the MFP 101 is confirmed, and in a case of a match, login, to the MFP 101, of the corresponding user is performed. The operation of reading an IC card may accord with the type of IC card. For example, an IC card, if it is of a contact type, is inserted into an IC card reader, and, if it is of a non-contact type, is brought close to or is made to touch the IC card reader. Note that, in this description, a user in a logged-in state is called a logged-in user. Also, login, by operation of a touch panel or a keyboard, of a user without the use of an IC card is called login by manual input or manual operation.

A PC 102 is an information processing apparatus that transmits print jobs to the MFP 101. The MFP 101 can register a user under a user name of the PC 102 at the time of receiving a print job. The PC 102 is connected, via a LAN or the Internet, with the MFP 101.

<Hardware Configuration of MFP>

Figure 2:
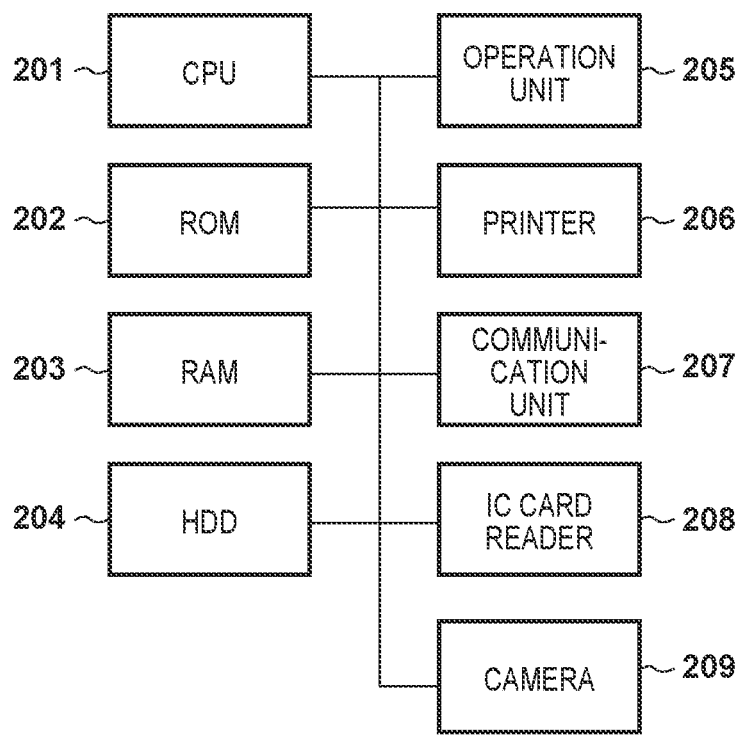
FIG. 2 is a view illustrating a hardware configuration of an MFP 101.

FIG. 2 is the simplified view illustrating a hardware configuration of the MFP 101. A CPU 201 is a central processing unit (processor) that controls operation of the entire MFP 101. A RAM (Random Access Memory) 203 is a volatile memory and is used as a temporary storage region for deploying various control programs stored in a ROM 202 and an HDD 204.

The ROM 202 is a non-volatile memory and stores a boot program of the MFP 101 and the like. The HDD 204 is a non-volatile hard disk that is larger in volume in comparison to the RAM 203. In the HDD 204, programs for controlling the MFP are stored. Also, an OS (Operating System) and application programs are stored in the HDD 204.

The CPU 201, when activating the MFP 101, executes the boot program stored in the ROM 202. This boot program is for reading out and then deploying, in the RAM 203, the OS (Operating System) program stored in the HDD 204. The CPU 201, after executing the boot program, successively performs control of the MFP 101 by executing the OS program deployed in the RAM 203. Also, the CPU 201 executes programs for control and application programs and stores, in the RAM 203, and performs reading/writing of data to be used for operation by these.

Note that, in the MFP 101, it is assumed that one CPU 201 executes each of the processing illustrated in the flowcharts, which will be described later, however, another configuration may be taken. For example, configuration may be taken such that a plurality of CPUs or microprocessors (MPUs) execute, in cooperation, each of the processing illustrated in the flowcharts, which will be described later. Also, configuration may be taken such that some of the processing, which will be described later, are executed using a hardware circuit such as an ASIC (Application Specific Integrated Circuit) or an FPGA (Field-Programmable Gate Array).

An operation unit 205 is a touch operable display, and various user interfaces, which will be described later, are displayed on the operation unit 205. In the present embodiment, user authentication that uses a keyboard is also performed using a virtual keyboard displayed on the operation unit 205. A printer 206 is a printer engine that prints print data received from external units via a communication unit 207. The communication unit 207 is a network interface for connecting to the Internet or a LAN (Local Area Network) of an office.

An IC card reader 208 is an apparatus for reading out information that is stored in an IC card and is used in user authentication and is a necessary unit for realizing IC card authentication.

<Software Configuration>

Figure 3:
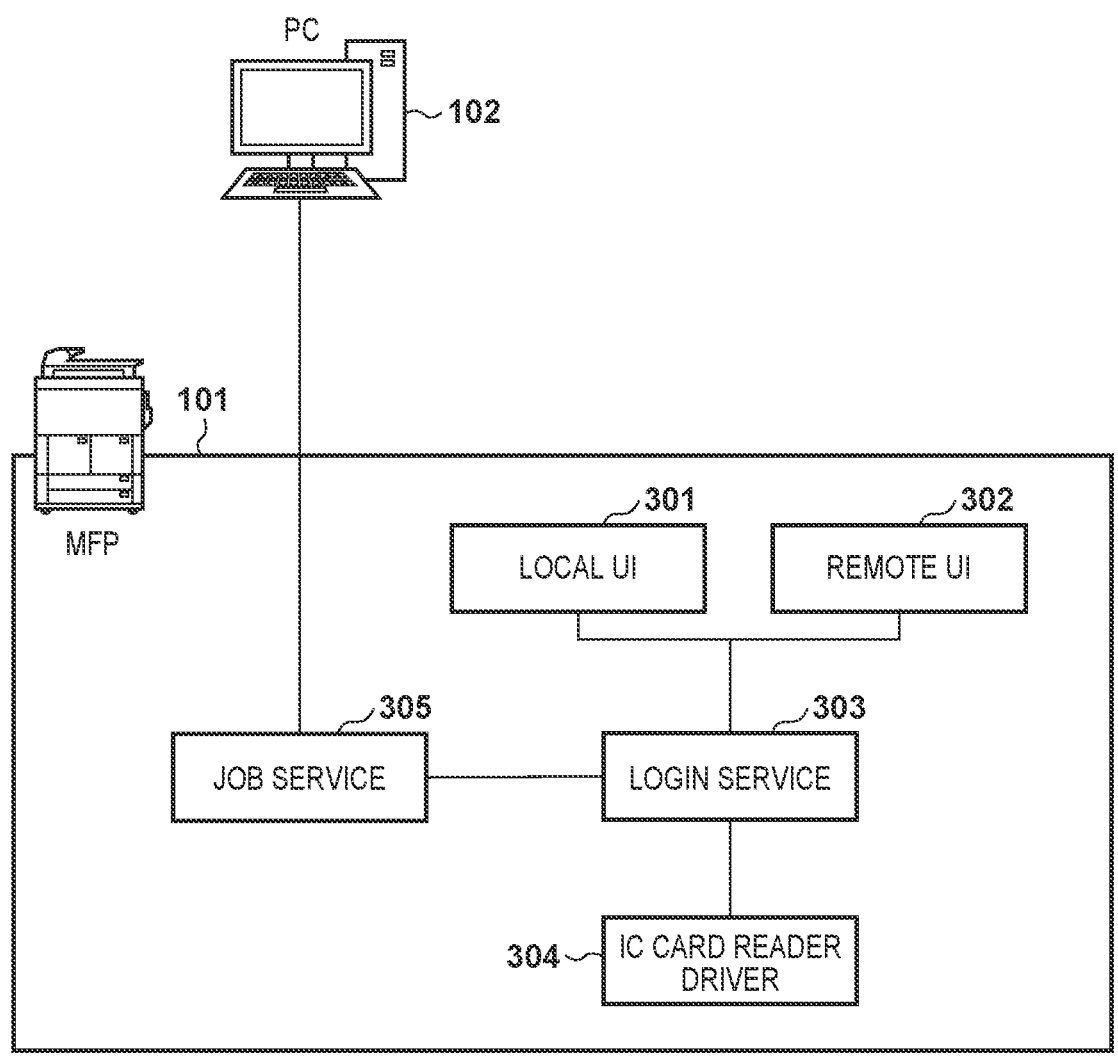
FIG. 3 is a view illustrating a configuration of software in the system.

FIG. 3 is the simplified view illustrating a software configuration of the MFP 101. A local UI 301 of the MFP 101 provides, via the display of the operation unit 205, user interfaces for the user to change settings and use functions of the MFP 101. Examples of user interfaces that the local UI 301 provides are illustrated in FIG. 4A to FIG. 4J. These user interfaces will be sequentially described in accordance with the description of operations and the like. A remote UI 302 has an HTTP (Hypertext Transfer Protocol) server function and provides, to a user, user interfaces configured by HTML (HyperText Markup Language). The user can access the remote UI 302 using a Web browser of a user terminal (e.g., the PC 102) and change settings or use functions of the MFP 101.

A login service 303 is a software module that authenticates and then logs in, to the MFP 101, users who use the local UI 301 or the remote UI 302. Also, the login service 303 can register, via user interfaces of the local UI 301 and the remote UI 302, administrator or general user accounts in, for example, an account information table, stored in the HDD 204. An example of account information stored in the HDD 204 is indicated in the following Table 1. In the HDD 204, user names, passwords, passcodes, card IDs of IC cards, roles (administrator/general user), email addresses, and the like, can be registered as account information. In the account information indicated in Table 1, passwords and passcodes are registered. A password is a text string in which alphanumeric characters and symbols can be used and is used for user authentication such as keyboard authentication or authentication from a remote UI. Meanwhile, a passcode is a simple PIN (personal identification number) code in which numbers up to 7 digits can be registered. Passcodes are for enabling an easy login from a panel using a numeric keypad and is used for increasing the convenience of simple login. Note that, in the present embodiment, a virtual keyboard can be used as a keyboard in order to employ a touch-panel user interface. Accordingly, passcodes may be interpreted as passwords in all the embodiments.

TABLE 1

| User Name | Password | Passcode | Card ID | Role | Email Address |
|---|---|---|---|---|---|
| Admin | ***** | ***** | ABC123456 | Administrator | admin@cano.com |
| Alice | ***** | ***** | ABC123457 | General User | alice@cano.com |
| Bob | ***** | ***** | | General User | bob@cano.com |
| Carol | ***** | ***** | ABC123459 | General User | carol@cano.com |
| Dave | ***** | ***** | | General User | dave@cano.com |

An IC card reader driver 304 controls, in the present embodiment, the non-contact IC card reader 208 and receives a signal transmitted from, for example, an IC card, and acquire data, for example, a card ID, included in that signal. The acquired data is handed over to, for example, the login service 303.

A job service 305 waits for print jobs from the PC 102 and receives print jobs. Then, job tickets, print data, and the like, for example, that accompany the received print jobs are stored in the HDD 204 and are registered as new print jobs. Furthermore, a function that analyzes print jobs and notifies the login service 303 of user names of jobs (i.e., owner names) is included. However, regarding this function of notifying the login service 303 of user names, it is not employed in the present embodiment.

• Processing Procedures by Login Service and User Interfaces

Figure 4A:
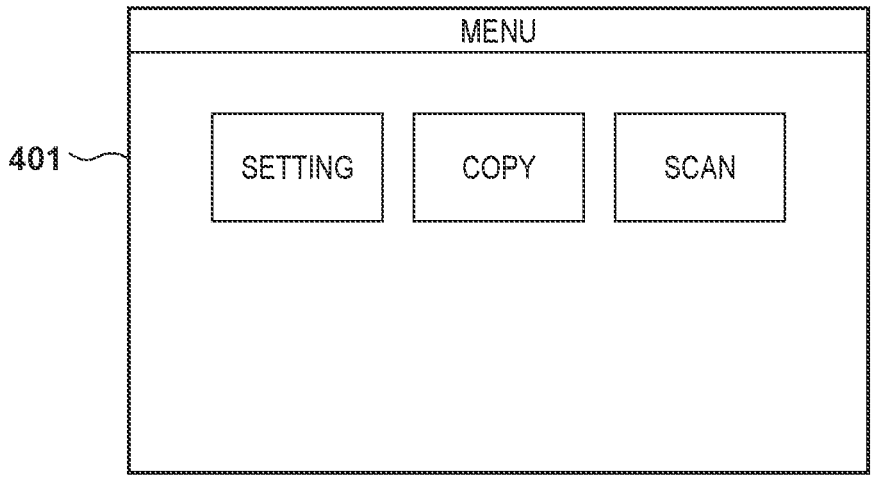
Figure 4B:
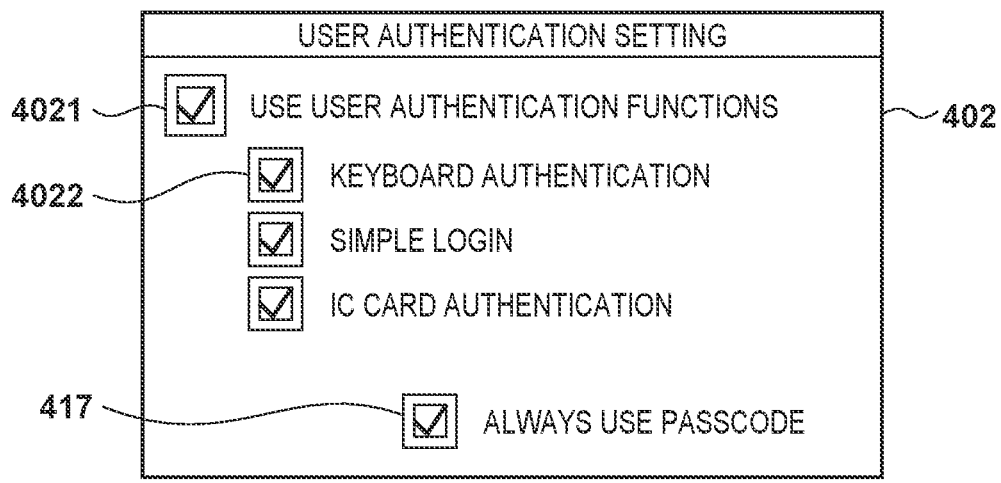
Figure 4C:
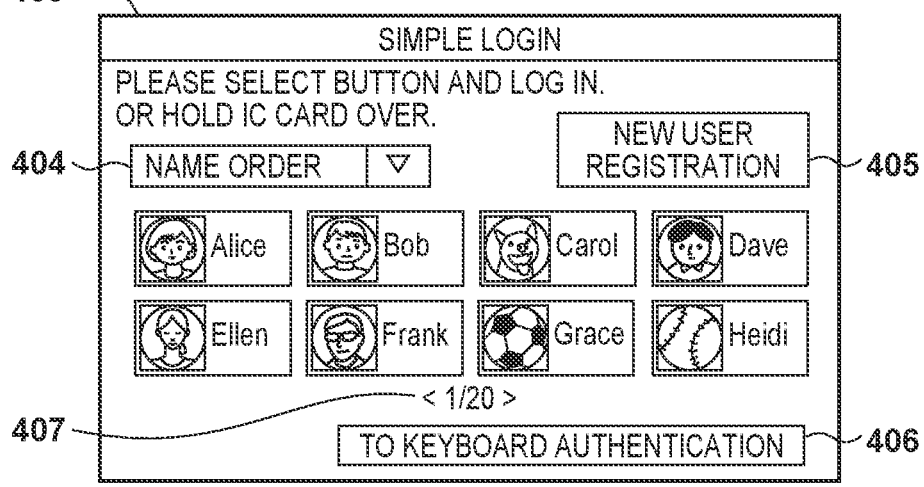

Next, login and user registration processing by the login service 303 will be described with reference to user interfaces of FIG. 4A to FIG. 4J. In a setting at the time of factory shipping, in other words, an initial setting, of the MFP 101, a user authentication function is disabled, and when the MFP 101 is activated, the local UI 301 displays a menu screen 401 (FIG. 4A) for selecting an application. Note that the simple login function, although it is displayed as a user authentication function on the user interfaces, is a function that identifies and logs in users without performing user authentication. Accordingly, the simple login function, although it is a login function, is not exactly a user authentication function. However, displaying it as a user authentication function makes it easier for the user that use the MFP 101 to understand; accordingly, user authentication is displayed, on a user interface, purposely including the simple login function as in, for example, a user authentication setting screen 402 (FIG. 4B). However, in the description of the present embodiment, login functions and the user authentication function are distinguished in order to distinguish the login functions that are accompanied by user authentication and the simple login function that is not accompanied by user authentication, and the user authentication function is configured so as not to include the simple login function. Accordingly, the user authentication function that can be selected from the user authentication setting screen 402 correspond to the login functions that include the simple login and is not strictly a user authentication function.

Furthermore, the user, by touching, via the menu screen 401, for example, the "setting" button and then by further selecting the user authentication setting (not shown), can display the user authentication setting screen 402 (FIG. 4B). On the user authentication setting screen 402, enabling/disabling of the user authentication function can be selected by a checkbox 4021. Also, in a case where enabling of the user authentication function is selected, one or a plurality of login functions from keyboard authentication, simple login, and IC card authentication can be selected by a checkbox 4022 and the like. Furthermore, by a checkbox 417 (also called a switch 417), it is possible to set so as to require passcode input. In a case where it is set so as to require passcode input, if a passcode is registered, passcode input at the time of a login would be prompted even if it is simple login. In other words, in such a case, simple login would also be accompanied by user authentication. The user authentication setting screen 402 indicates a state in which the user authentication function has been enabled and all the login functions as well as passcode input have been selected.

In a case where all the login functions (keyboard authentication, simple login, IC card authentication) are enabled, the local UI 301 displays a simple login screen 403 (FIG. 4C) as an initial screen. Note that IC card authentication is possible even from the screen 403 by the user holding an IC card over the IC card reader 208. Also, keyboard authentication is possible by transitioning to a keyboard authentication screen 412 by selecting a button 406. In other words, in a case where the simple login function is set as a login function, the local UI 301 displays the simple login screen 403 even if other login functions are enabled. Also, in a case where the simple login function is not set, if keyboard authentication is enabled, the keyboard authentication screen 412 (FIG. 4E) will be displayed, and if only the IC card authentication is enabled or the IC card authentication and the keyboard authentication are enabled, an IC card authentication screen 413 (FIG. 4F) will be displayed. The IC card authentication screen 413 provides a button 414 for displaying the keyboard authentication screen 412.

On the simple login screen 403, buttons of registered users are displayed. By having a user select their button, the user can be logged in to the MFP 101.

In a case where the buttons of registered users cannot be displayed in one screen, the buttons are displayed across a plurality of pages. A button 407 is a button for transitioning to another page from a page number that is currently being displayed. The simple login screen 403 comprises a function of sorting the buttons. A drop-down 404 is a drop-down for selecting the sort order of the buttons. For example, name order, registration order, and order of last login time, and the like can be selected.

Figures 4D, 4E, 4F:
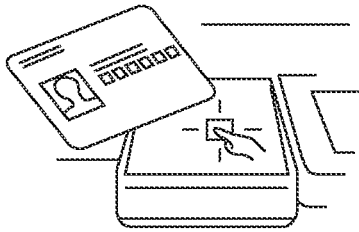
Figure 4I:

A new user registration button 405 is a button for general users to register their account. The local UI 301, when it detects pressing of the new user registration button 405, displays a user registration screen 408 (FIG. 4D). Note that, in this description, touch of a button displayed on a touch panel is called a press. On the user registration screen 408, input of a user name, a passcode, an email address, and the like of a newly registering user are accepted. In the present embodiment, a passcode 410 is inputted at the time of selecting a user in simple login; however, a configuration in which a passcode is not used and a password 421 is inputted at the time of selecting a user in simple login is conceivable. Also, a function of selecting an icon to be displayed together with the user button on the simple login screen 403 is provided.

Also, in a case where pressing of a registration button 409 of a card ID is detected, a state in which IC card data is readable is entered by operating the IC card reader 208 via the IC card reader driver 304. In a case where a signal is received from an IC card by the IC card being held over the IC card reader 208, a card ID included in the signal is acquired.

When pressing of a registration button 411 is detected, information inputted on the user registration screen 408 is registered in the HDD 204 as account information (Table 1) of a corresponding user.

The login service 303, in a case where an IC card is detected in a state in which the simple login screen 403 is displayed, refers to the account information stored in the HDD 204 and logs the user with whom the card ID matches into the MFP 101. Also, in a case where pressing of the button 406 that displays keyboard authentication is detected, the keyboard authentication screen 412 is displayed and then user name/password input is accepted. The login service 303 verifies the user name and the password inputted into the keyboard authentication screen 412 with the account information stored in the HDD 204 and logs the matching user into the MFP 101. In a case of IC card authentication and in a case of keyboard authentication, if there is no corresponding user, the login will fail.

The login service 303 stores, in an object called login context, the information of the logged-in user and then transmits it to another software module. An example of information stored in the login context is indicated in the following Table 2. In the login context, as indicated in Table 2, a user name, a role, an email address, and the like of the logged in user are stored.

TABLE 2

| Item | Value |
| --- | --- |
| Login User Name | Alice |
| Role | General User |
| Email Address | alice@cano.com |

In a case where login to the MFP 101 is successful, the local UI 301 closes login screens such as the screens 403 (FIG. 4C), 412 (FIG. 4E), and 413 (FIG. 4F) and then transitions the screen to the menu screen 401. The login service 303 refers to the login context and, after having identified the logged in user, provides the menu screen for the logged-in user. For this, a function that enables personalization of, for example, the menu screen or the screens of various functions (copy and scan) in accordance with user preference is provided. Personalization information that indicates personalized screens, functions, and the like are stored in association with a user, and if there is a newly logged-in user, personalization information associated with the corresponding user is referred to and then is reflected to the menu screen 401.

<Flow of IC Card Authentication Operation>

Next, operation for when the login service 303 registers an IC card will be described with reference to the flowchart of FIG. 5. Here, a form in which at least two login functions of IC card authentication and the simple login function are enabled is envisioned.

The login service 303 is executed by controlling the program of the login service 303 that the CPU 201 of the MFP 101 loaded into the RAM 203.

Using activation of the MFP 101, logout of a user, or the like as a trigger, the login service 303 displays the simple login screen 403 on the local UI 301. When a user selects their icon (step S502), the login service 303 determines whether the user is a user who has registered IC card information (step S503) by referring to the account information stored in the HDD 204. For example, in the example of Table 1, it is determined that Alice and Carol are users whose card IDs have already been registered, and Bob and Dave are users whose IC cards are unregistered.

In a case where it is determined that it is a user whose IC card is registered, a passcode input screen 415 (refer to FIG. 4G) is displayed (step S504). By this screen, a message that an IC card is registered and that authentication by the IC card is possible is displayed. If the login service 303 detects an IC card in a state in which this screen 415 is displayed (step S506—YES), IC card authentication is performed (step S508). In a case of performing IC card authentication here, the login button does not need to be pressed. In IC card authentication, a card ID included in the detected IC card is compared with a card ID of the account information that is stored in the HDD 204 and corresponds to the selected icon to determine whether the card ID of the IC card and the card ID of the account information match. In a case where IC card authentication is successful, login to the MFP 101 is performed (step S512), and then the menu screen 401 is displayed. In a case where the card ID of the IC card and the card ID of the account information do not match, an error screen (not shown) indicating that the card IDs do not match is displayed, the processing returns to step S504, and the passcode input screen 415 is displayed again.

When the login service 303 does not detect an IC card and detects passcode input (step S507—YES), passcode authentication is performed (step S509). A trigger for detecting passcode input may be touch of a login button. In passcode authentication, an inputted passcode is compared with a passcode of the account information stored in the HDD 204 and corresponding to the selected icon match to determine whether the inputted passcode and the passcode of the account information match. In a case where passcode authentication is successful, login to the MFP 101 is performed (step S512), and then the menu screen 401 is displayed. In a case where the inputted passcode and the passcode of the account information do not match, an error screen (not shown) indicating that the passcodes do not match is displayed, the processing returns to step S504, and the passcode input screen 415 is displayed again.

Also, in a case where a state in which the checkbox 417 for always using a passcode is enabled, passcode input is generally necessary; however, in the present embodiment, regarding the users whose IC cards are registered, login is possible only with authentication by IC card.

Meanwhile, regarding users whose IC cards are determined as unregistered in the determination, in step S503, of whether the user's IC card information is registered, it is determined whether passcode input is necessary or unnecessary (steps S5031 and S5032). In a case where it is determined necessary in step S5032, the processing branches to step S505, and in a case where it is determined unnecessary, the processing branches to step S512, and then login is directly performed. Note that the determination processing in step S5031 will be described with reference to FIG. 6.

In a case where it is determined that passcode input is necessary, a passcode input screen 416 (FIG. 4H) is displayed (step S505). By this screen, a message that an IC card is unregistered and it is displayed that registration by the IC card is possible. Users attempting to register an IC card in this screen hold the IC card over the IC card reader 208, input a passcode, and then touch the login button.

With this, the processing advances to step S513. When the login service 303 detects passcode input (step S513—YES), passcode authentication is performed by comparing an inputted passcode and a passcode of the account information stored in the HDD 204 as to whether they match (step S514). In a case where the passcodes match (step 515—YES), the login service 303 further determines whether IC card information is inputted (step S516). In a case where the IC card information is inputted, the login service 303 performs registration of the card ID acquired from the IC card as a card ID of the account information in the HDD 204 of the corresponding user (step S517). Then, login to the MFP 101 (step S512) is performed, and the menu screen 401 is displayed.

Figure 6:
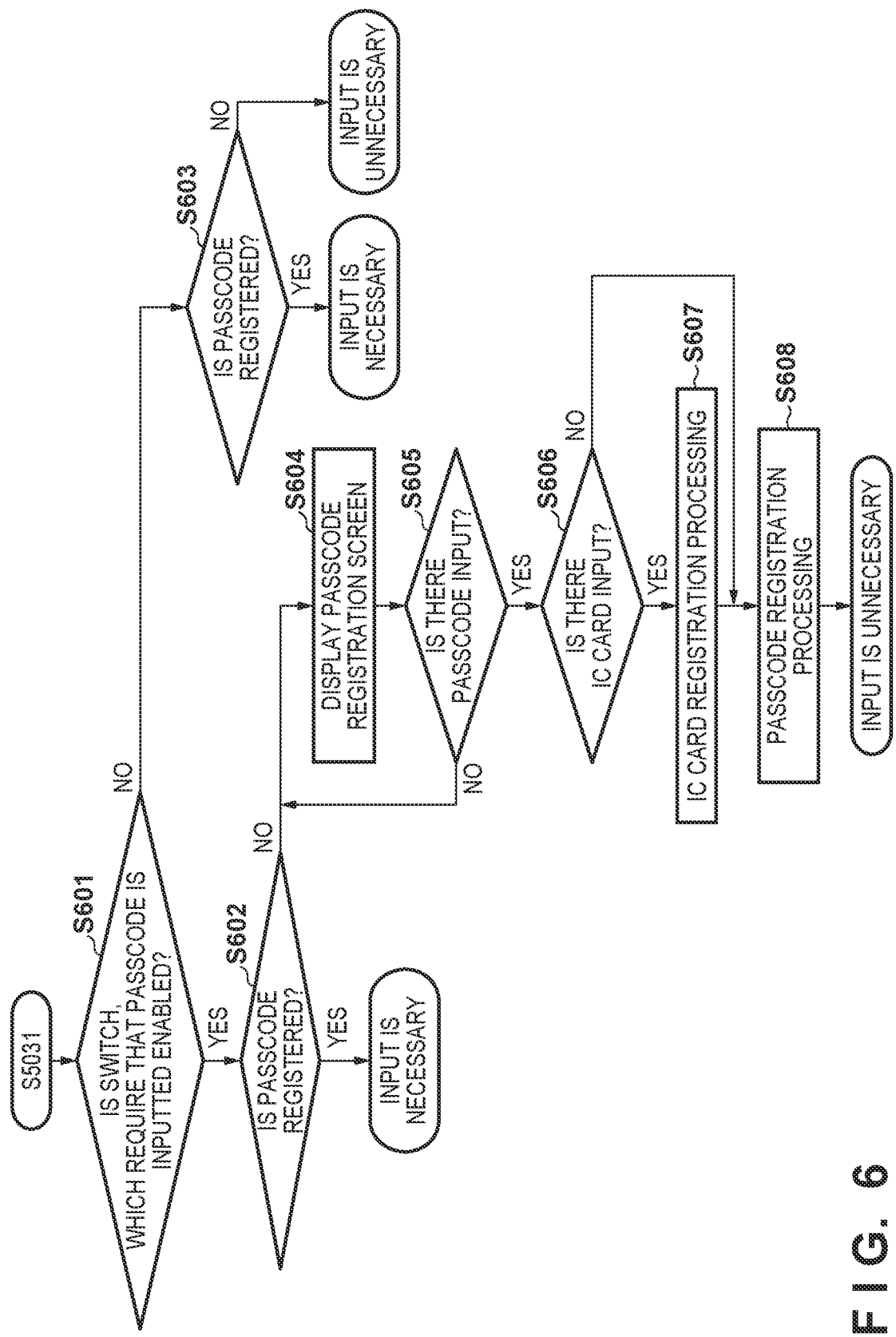
FIG. 6 is a flowchart illustrating processing related to a switch, which requires that a passcode is inputted.

FIG. 6 illustrates details of step S5031 for determining whether passcode input is necessary/unnecessary and is a flowchart illustrating details of processing for applying, at the time of login, a setting of the checkbox 417 for always using a passcode.

After the user selects their icon in step S502, it is determined whether the checkbox 417, which requires that a passcode is inputted, is enabled (step S601). In a case where it is enabled, it is determined whether a passcode is registered (step S602). In a case where the passcode is registered, it is decided that a passcode needs to be inputted. In such a case, processing from steps S5032 to the previously-described S505 is performed in continuation.

In a case where a passcode is unregistered, a passcode registration screen 418 (FIG. 4I) is displayed (step S604). In this state, in a case where the user has an IC card, it is possible to register, by having the IC card touch the IC card reader 208 and then inputting the passcode, IC card information (specifically, a card ID) together with the passcode into the account information in the HDD 204.

When the login service 303 detects passcode input (step S605), in other words, detects passcode input and touch of the login button, it is further determined whether or not there is input of IC card information (step S606). If the IC card information is inputted, the login service 303 performs registration of the card ID to the account information in the HDD 204 (step S607). Furthermore, the login service 303 performs registration of the passcode inputted to the account information in the HDD 204 (step S608). In a case where an IC card is not detected, only the registration processing of the passcode in step S608 is performed. In a case where step S608 is executed, the passcode has just been registered; therefore, passcode input is decided to be unnecessary. In such a case, login processing from steps S5032 to the previously-described S512 is performed in continuation.

In a case where the checkbox 417, which requires that a passcode is inputted, is disabled in step S601, it is determined whether the passcode is registered (step S603). In a case where the passcode is registered, it is decided that passcode input is necessary, and processing from steps S5032 to the previously-described S503 is performed in continuation. In a case where the passcode is unregistered, login is performed without a passcode; accordingly, it is decided that passcode input is unnecessary, and processing from steps S5032 to the previously-described S512 is performed in continuation.

As described above, the image forming apparatus according to the present embodiment can register an IC card at the time the user inputs a passcode from the simple login screen without the administrator needing to perform, in advance, the task of registering IC cards. Accordingly, it is very convenient. Particularly, in the present embodiment, in a case where a passcode needs to be inputted at the time of user login, an IC card can be registered together with passcode input. Accordingly, by setting an option that requires passcode input at the time of login, the user can register an IC card at the time of login. By this, the administrator, simply by setting an option that requires passcode input at the time of login, can have the user perform registration of an IC card.

Note that in a case where it is determined that the card is registered in step S503 of FIG. 5, the user does not have an opportunity to register a passcode. This is because in a case of logging in with an IC card, passcode input is unnecessary regardless of the setting of an option that requires a passcode.

Second Embodiment

In the present embodiment, operation for when registering a user for when a print job is transmitted in relation to the MFP 101 from the PC 102 will be described. Here, a form in which at least two login functions of IC card authentication and the simple login function are enabled is envisioned.

The job service 305 is executed by controlling the program of the job service 305 that the CPU 201 of the MFP 101 loaded into the RAM 203. Some of the processing of the job service 305 of FIG. 7 will be described.

The job service 305 waits for print jobs from the PC 102, and when it receives a print job (step S701), analyzes the received print job (step S702) and notifies the login service 303 of a user name (owner name) of the job. The login service 303, if the received user name is unregistered, generates and then registers, in the account information table of the HDD 204, the account information of that user (step S703). At this time, the registration is performed such that those other than the user name are in a blank state and the passcode and the like are left unset. Note that, regarding the role, for example, "general user" may be registered as a default value. Also, regarding the received print jobs, there are cases where they are printed as is; however, in the present embodiment, regarding job tickets related to print jobs, print data is stored in the HDD 204, and a print instruction is waited to be performed by the user. The user logs in and then selects and instructs execution of a desired print job from a list of print jobs of which the user is an owner. In response to this, the selected print job is executed.

Login of the user is performed in accordance with the procedures of FIG. 5 and FIG. 6. In a case where a state in which the checkbox 417 for always using a passcode is enabled, when the user that has performed job input, for example, selects their icon for the first time on the simple login screen 403, the passcode registration screen 418 is displayed (step S604). At this time, in a case where the user has an IC card, it is possible to register, by having the IC card touch at the time of inputting the passcode, IC card information together with the passcode into the account information in the HDD 204.

As described above, in the present embodiment, the user does not need to register to an image forming apparatus 101 in advance. By inputting a print job into an image forming apparatus, the user of that print job is registered, and it is also possible for the user to perform registration of an IC card in a manner described in the first embodiment.

Third Embodiment

In the present embodiment, operation for when a plurality of users share one IC card and the IC card information thereof is registered will be described.

TABLE 3

| User Name | Password | Passcode | Card ID | Role | Email Address |
|---|---|---|---|---|---|
| Admin | ***** | | ABC123456 | Administrator | admin@cano.com |
| Alice | ***** | ***** | ABC123457 | General User | alice@cano.com |
| Bob | ***** | ***** | | General User | bob@cano.com |
| Carol | ***** | ***** | ABC123459 | General User | carol@cano.com |
| Dave | ***** | ***** | ABC123457 | General User | dave@cano.com |

In Table 3, Alice and Dave are registered under the same IC card ID, "ACB123457".

Figure 4J:

When the IC card of the card ID, "ABC123457", is touched on the simple login screen 403, it is determined whether the card ID is registered in association with a plurality of users. In a case where it is registered in association with a plurality of users, icons of users that correspond to the touched IC card are displayed on the simple login screen such as on a screen 419 (FIG. 4J). The user touches any icon that corresponds. Regarding operation after touching the icon is the same as the flow described in FIG. 5 of the first embodiment.

As described above, in the present embodiment, a login operation can be performed also in a case where a plurality of users share one IC card as explained in the first embodiment and the second embodiment.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-103230, filed Jun. 15, 2020 which is hereby incorporated by reference herein in its entirety.

What is claimed is:

1. An image forming apparatus operable to accept a login of a user by an input of medium information stored in a storage medium or an input via a user interface, the apparatus comprising:
at least one processor and at least one memory couple to each other and cooperating to act as:
a storage configured to store account information that includes user identification information of a registered user and can further include the medium information associated with the user;
a reader configured to read the medium information from the storage medium;
a user interface configured to display a screen and accept an input; and
a controller configured to accept a login by a user, wherein
the controller, in a case where, at the time of a login of a user via the user interface, in a state in which a screen that accepts an input of a password of the user via the user interface is displayed, the medium information associated with the user attempting to log in has not been registered, registers, in association with the user, the medium information inputted by the reader.

2. The image forming apparatus according to claim 1, wherein
the password is a password that is inputted for a login of the user and is registered in association with the user.

3. The image forming apparatus according to claim 1, wherein
the password is a password registered in association with the user.

4. The image forming apparatus according to claim 3, wherein
the controller, in a case where, at the time of a login via the user interface, a setting that requires an input of a password has been set and a password has not been registered in association with a user attempting to log in, accepts an input of a password to be registered in association with the user.

5. The image forming apparatus according to claim 1, wherein
the controller, in a case where the medium information is inputted by the reader, performs a user authentication by the medium information and does not perform a user authentication by a password.

6. The image forming apparatus according to claim 1, wherein
the controller, in a state in which a user is not logged in, displays, on the user interface, an icon of a user registered in the account information, and
regarding a user of a selected icon, as necessary, performs a user authentication and allows the user to log in.

7. The image forming apparatus according to claim 6, wherein
the controller, in a case where a password is registered in association with a user of the selected icon, accepts an input of the password via the user interface and performs a user authentication by a password.

8. The image forming apparatus according to claim 6, wherein
the controller, when, in a state in which the icon is displayed on the user interface, the medium information is inputted by the reader, logs in a user registered in the account information in association with the medium information.

9. The image forming apparatus according to claim 8, wherein
the controller, in a case where the medium information inputted by the reader is associated with a plurality of users, displays, on the user interface, an icon of a corresponding associated user.

10. The image forming apparatus according to claim 1, wherein
the controller, when a print job is received from an external apparatus, registers, in the account information, user identification information of a user of the print job.

11. A control method of an image forming apparatus operable to accept a login of a user by an input of medium information stored in a storage medium or an input via a user interface, wherein
the image forming apparatus comprises a storage configured to store account information that includes user identification information of a registered user and can further include the medium information associated with the user, a reader configured to read the medium information from the storage medium, and a user interface configured to display a screen and accept an input, and
the method accepts a login by a user and, in a case where, at the time of a login of a user via the user interface, in a state in which a screen that accepts an input of a password of the user via the user interface is displayed, the medium information associated with the user attempting to log in has not been registered, registers, in association with the user, the medium information inputted by the reader.

12. A non-transitory computer readable medium operable to store a program, wherein the program, when executed by a computer, causes the computer to execute the following procedures:
accepting a login of a user by an input of medium information stored in a storage medium or an input via a user interface;
storing account information that includes user identification information of a registered user and can further include the medium information associated with the user;
reading the medium information from the storage medium;
registering, in a case where, at the time of a login of a user via user interface, in a state in which a screen that accepts an input of a password of the user via the user interface is displayed, the medium information associated with the user attempting to log in has not been registered, the inputted medium information in association with the user.

\* \* \* \* \*